United States Patent [19]

Scalzi

[11] 4,190,300
[45] Feb. 26, 1980

[54] BEARING FOR LINER-HANGER ASSEMBLY

[75] Inventor: Louis M. Scalzi, Laconia, N.H.

[73] Assignee: New Hampshire Ball Bearings, Inc., Laconia, N.H.

[21] Appl. No.: 959,487

[22] Filed: Nov. 13, 1978

[51] Int. Cl.² ............................................. F16C 17/08
[52] U.S. Cl. .................................................. 308/4 A
[58] Field of Search ................ 308/4 A, 8.2, 163–165; 175/325, 371, 372

[56] References Cited

U.S. PATENT DOCUMENTS

| | | | |
|---|---|---|---|
| 2,696,367 | 12/1954 | Robishaw | 308/4 A X |
| 3,797,594 | 3/1974 | Goodfellow | 175/325 |
| 4,033,640 | 7/1977 | Garcia | 308/4 A |

Primary Examiner—Charles E. Phillips
Attorney, Agent, or Firm—Richard P. Crowley

[57] ABSTRACT

An improved bearing assembly adapted for use in a liner-hanger assembly, which bearing assembly comprises: an upper cylindrical race element having a lower cylindrical surface; a lower cylindrical race element having an upper cylindrical surface and having adjoining inside and outside side surfaces; a load-bearing, low coefficient-of-friction bearing-liner material secured between the lower cylindrical surface of the upper race element and the upper cylindrical surface of the lower race element; inside and outside sealing-liner material secured to the inside and outside side surfaces of the lower race element; and inside and outside sleeve elements secured to and extending from the upper race element and extending parallel with the inside and outside liner material and into a close slidable and sealing relationship thereto, thereby providing an improved bearing assembly which prevents drilling mud or other debris from contacting the load-bearing bearing-liner material between the upper and lower face elements.

11 Claims, 4 Drawing Figures

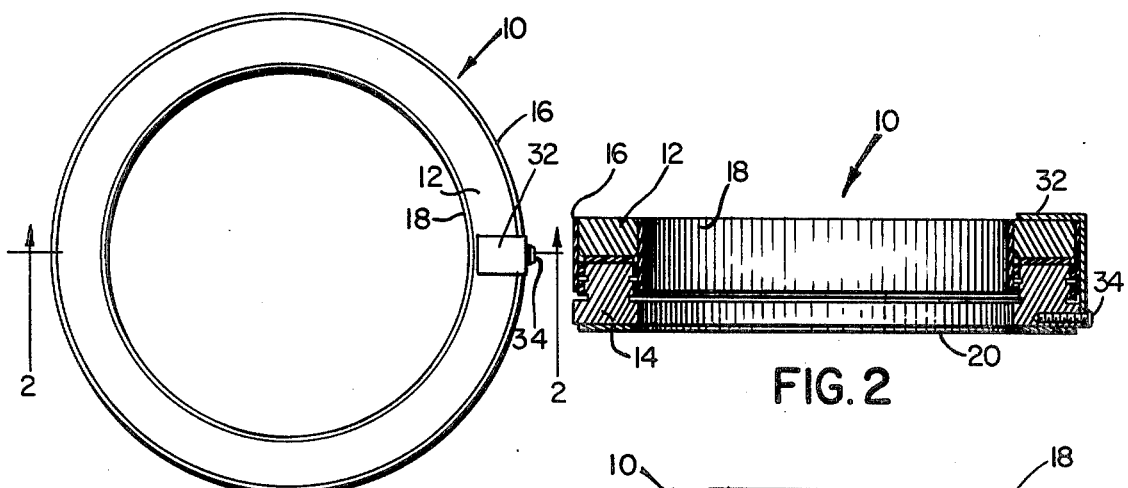
FIG. 1
FIG. 2
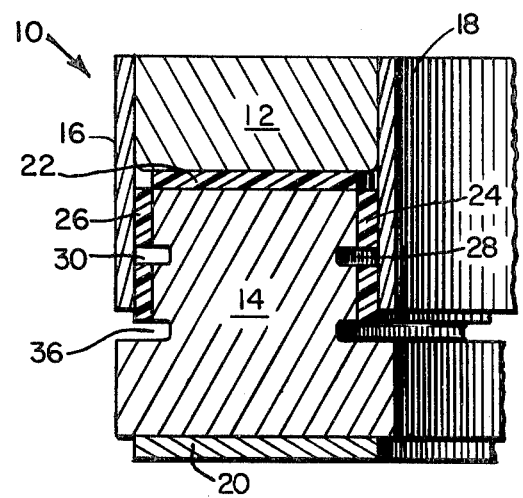
FIG. 3
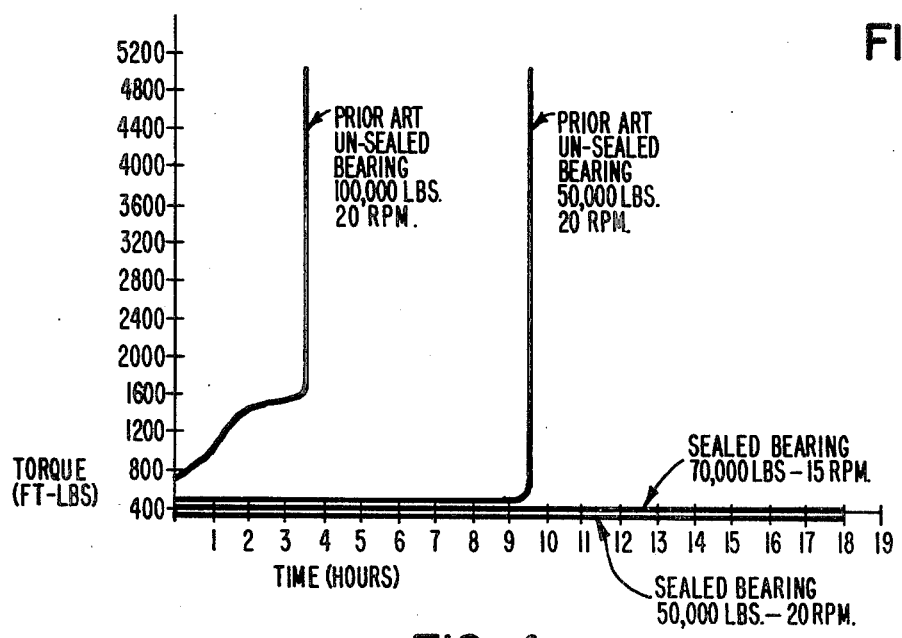
FIG. 4

BEARING FOR LINER-HANGER ASSEMBLY

BACKGROUND OF THE INVENTION

1. Field of the Invention

This invention relates to an improved sealed bearing particularly for use in oil and gas-well operations employing multiple liner-hanger assemblies.

2. Prior Art

In well-drilling operatons, such as in oil and gas wells, the well pipe is cemented into the bore hole and the liner pipes are suspended in the bore hole from hangers. It has been found desirable, during the cementing operations, to rotate the casing liner to ensure an even application of the cement and the proper displacement of the drilling mud. In operation the casing liner is cemented in the well casing by using a liner hanger, and the liner hanger is rotated through the use of a bearing assembly. Both open-type and seal bearings have been proposed for use in such liner-hanger assemblies and method, such as, for example, as set forth in U.S. Pat. No. 4,010,804, issued Mar. 8, 1977, and U.S. Pat. No. 4,033,640, issued July 5, 1977, both of which are hereby incorporated by reference in their entirety in this application.

The above patents are directed to a series of cooperating liner hangers which distribute the load on a bearing, with each hanger assembly located a selective distance from the other hanger assemblies, and a bearing arrangement employed with each of the hangers to provide rotational capacity to the hanger. FIGS. 5, 5A and 5B of the patents show prior-art bearings employed for liner-hanger assemblies and are described more particularly in column 5, lines 3-30 in each patent. The bearing assembly described comprises upper and lower bearing plates, with the interface of the two bearing plates fabricated of a resilient bearing material with a low coefficient of friction. Such bearings as described have not proven wholly satisfactory in use. The bearings being described as seal bearings are, in effect, not entirely sealed, and, under actual operating conditions, where the bearings are exposed to drilling mud and other contaminants under high torque conditions, are subject to failure. The present invention is directed to an improvement in bearings for the same end use.

SUMMARY OF THE INVENTION

The invention relates to an improved sealed bearing assembly particularly for use in an apparatus and a method of suspending a well pipe from an upper well pipe in a well bore. In particular the invention is directed to improved sealed bearings as part of a liner-hanger assembly and its method of installation, wherein multiple individual hanger units are arranged in series, with the improved sealed bearing assembly between the individual hanger units.

My improved bearing assembly, for use with a liner-hanger assembly between individual hanger units, comprises an upper cylindrical race element having a lower cylindrical surface and a lower cylindrical race element having an upper cylindrical surface and inside and outside surfaces. The bearing assembly includes a load-bearing, low coefficient-of-friction bearing-liner material secured, such as by resin-bonding, to the upper surface of the lower race element, in order to be disposed to support the lower surface of the upper race element and to bear the load of the individual hanger elements placed thereon. My improved bearing assembly includes resilient sealing material on the inside and outside side surfaces of the lower race element, such as a low coefficient-of-friction bearing-liner material, which may be the same or different from the load-bearing material employed in the upper surface of the lower race element. Such liner material may be a resilient sheet material typically bonded to the inside and outside surfaces of the lower race element and adapted to provide a seal to protect the load-bearing, low coefficient-of-friction bearing-liner material. The bearing-liner material may be material, for example, as described in U.S. Pat. No. 3,950,599, issued Apr. 13, 1976, which comprises a composite, laminate, fluorocarbon, nylon, resin-bearing material, one surface of which is adapted to be a load-bearing surface and the other surface of which is adapted to be bonded through the curing of a resin to a surface, such as the upper cylindrical surface of the lower race element.

My improved bearing assembly includes inner and outer extending sleeve elements which extend from the upper race element and are extended to a close sealing relationship with the resilient liner material on either side of the inside and outside surfaces of the lower race element, to provide an integral seal against such liner material, which prevents drilling mud and other contaminants from reaching the load-bearing, low coefficient-of-friction bearing material between the upper and lower surfaces of the race elements. Optionally, if desired, my bearing assembly may comprise also a low-torque, soft, metal-type washer element on the lower surface of the lower race element, such as a beryllium-copper alloy material bonded or retained to the bottom of the lower cylindrical surface of the lower race element. In the event of a freeze-up of the bearing assembly in use and where it is desired to obtain a few more revolutions of the bearings, the low-torque, soft, metal washer permits the lower face element to be mobile for such additional rotation. In addition and optionally, inside and/or outside catcher grooves are provided in the lower race element in order to entrap or gather any debris or contaminants which may be forced into the inside or outside surfaces of the lower race element during use and to prevent such debris or contaminants from fouling the surface of the low-friction load-bearing material.

My improved bearing assembly may be employed in the liner-hanger assembly, as set forth and described in the referenced U.S. patents, and is proposed as an improved bearing assembly for other uses and as a substitute for the bearings as shown in FIG. 5 of such patents. My invention will be described for the purpose of illustration only in connection with a preferred embodiment in a specific illustration. However, it is recognized that various changes and modifications may be made in my bearing assembly and in the hanger assembly containing my bearings without departing from the spirit and scope of my invention.

BRIEF DESCRIPTION OF THE DRAWINGS

FIG. 1 is a top plan view of my improved bearing assembly.

FIG. 2 is a cross-sectional view along the lines 2—2 of FIG. 1

FIG. 3 is an enlarged fragmentary cross-sectional view of the left side of the bearing as viewed in FIG. 2.

FIG. 4 is a graphical illustration of test data showing the torque in foot pounds versus the time in hours of both prior-art bearings and the improved bearing assembly of my invention.

DESCRIPTION OF THE EMBODIMENTS

My improved bearing assembly 10 comprises an upper cylindrical rotating race element 12 and a lower cylindrical stationary race element 14, with an outer-sleeve extending element 16 and an inner-sleeve extending element 18 electron beam-welded to the inner and outer sides of the upper race bearing 12 and extending over the inside and outside of the lower race bearing 14. The bearing assembly includes a lower beryllium-copper washer element 20 which provides for additional mobility of the race elements, in the event of a freeze-up of the bearing in use in a hanger assembly. My improved bearing includes an upper bearing liner 22, such as one of resin-bonded Teflon (a registered trademark of DuPont Company), having a low coefficient of friction and which is adapted to bear the load of the individual hanger units.

My improved bearing includes an inside liner 24 and an outside liner 26 which, as illustrated, is of the same material as the upper load-bearing liner 22. All of the liners are bonded by resin-bonding to the respective surfaces of the lower face element 14. The inside and outside bearing liners 24 and 26 are not load-bearing surfaces, but are bonded to the inside and outside of the lower race element 14 and, on the opposite side thereon, are in a close sealing contact and relationship with the respective surfaces of the inner and outer sleeves 16 and 18, thereby permitting a sealing and rotating contact of the inner 18 and outer 16 sleeve elements against the inside and outside bearing-liner materials 24 and 26.

My improved bearing assembly also contains inside and outside catcher grooves 28 and 30 to serve as a depository for the debris which may accumulate between the inner and outer sleeves of the inner and outer liners. Typically, as shown, the inner and outer liner materials extend on either side of the catcher grooves 28 and 30. My improved bearing assembly also has a groove 36 which is a grind relief and which permits relief of the grinding wheel during manufacture thereof. My improved bearings are prepacked with a lubricant, such as MIL-G-21164 grease, and also include a collar 32 and retaining screw 34 to retain the collar in position, the collar acting to maintain the upper and lower race elements together prior to use in the liner hanger assembly.

In operation, the improved bearing as described is substituted for the bearing assembly, as described in FIGS. 5, 5A and 5B of the previously described U.S. Pat. Nos. 4,033,640 and 4,010,804, and is employed between individual hanger units in a hanger-liner assembly, wherein the individual hanger units are rotated, thereby facilitating rotation of the casing liner in the well bore during the cementing operation.

FIG. 4 is a graphical illustration of certain test data showing the superior performance of the sealed bearing assembly of my invention (FIGS. 1-3) versus the bearing assembly as shown and described in FIGS. 5, 5A and 5B of the U.S. patents above. The graph illustrates the torque in foot-pounds versus time of operation and various load and RPM conditons. As illustrated, in directly comparative laboratory tests, wherein the bearings are rotated in drilling mud, the unsealed bearings of the prior art at 100,000 pounds and at 20 RPMs failed after only 3½ hours of use and at 50,000 pounds failed after only 9½ hours of use, while in comparison, the improved bearing assembly shown and described in this invention (FIGS. 1-3), at both 70,000 pounds and 50,000 pounds at 15 and 20 RPMs, continued to operate and showed a very low torque. The dramatic increase in torque, as shown for the prior-art bearings, is a representation of the failure of the bearings. As illustrated, the improved bearing assemblies of this invention are surprisingly and vastly superior in performance over the prior-art bearings as employed in bearing assemblies for pipe-liner hanger assemblies.

What I claim is:

1. An improved bearing assembly adapted for use in a liner-hanger assembly, which bearing assembly comprises:
   (a) an upper cylindrical race element having a lower cylindrical surface;
   (b) a lower cylindrical race element having an upper cylindrical surface and having adjoining inside and outside side surfaces;
   (c) a load-bearing, low coefficient-of-friction bearing-liner material secured between the lower cylindrical surface of the upper race element and the upper cylindrical surface of the lower race element;
   (d) inside and outside sealing-liner material secured to the inside and outside side surfaces of the lower race element; and
   (e) inside and outside sleeve elements secured to and extending from the upper race element and extending parallel with the inside and outside liner material and into a close slidable and sealing relationship thereto, thereby providing an improved bearing assembly which prevents drilling mud or other debris from contacting the load-bearing bearing-liner material between the upper and lower race elements.

2. The improved bearing of claim 1 wherein the bearing assembly is further characterized by a catcher groove disposed in at least one side surface of the lower race element and having a bearing-liner material on either side thereof, the catcher groove designed to retain debris and prevent such debris from contacting the load-bearing bearing-liner material.

3. The bearing assembly of claim 1 which includes a soft, metal washer element disposed and bonded to the lower cylindrical surface of the lower race element, to permit further rotation of the bearing assembly on freeze-up of the bearing assembly in use.

4. The improved bearing-liner material of claim 3 wherein the washer comprises a berrylium-copper washer element.

5. The bearing assembly of claim 1 which includes a means for retaining the upper and lower race elements together in a bearing assembly prior to use.

6. The bearing assembly of claim 1 wherein the bearing-liner material comprises a fluorocarbon, nylon, laminate material as the load-bearing liner material resin-bonded to the upper surface of the lower race element.

7. The bearing assembly of claim 1 which includes a grind-relief groove positioned at the lower portion of the lower race element.

8. The bearing assembly of claim 1 wherein the sealing-liner material is the same material as the load-bearing liner material.

9. A liner-hanger assembly which comprises a plurality of spaced-apart, individual hanger units arranged on a lower well pipe and attached to an upper well pipe, each hanger unit having an improved bearing means, as described in claim 1, connected to the upper well pipe, to permit rotation of the lower well pipe relative to the upper well pipe.

10. An improved bearing assembly adapted for use in a liner-hanger assembly which comprises a series of individual hanger units, which improved bearing assembly comprises:
   (a) an upper cylindrical race element having a lower cylindrical surface;
   (b) a lower cylindrical race element having an upper cylindrical surface and having adjoining inner and outer parallel side surfaces;
   (c) a low coefficient-of-friction, load-bearing liner material resin-bonded to the upper cylindrical surface of the lower race element;
   (d) inside and outside low coefficient-of-friction bearing-liner material resin-bonded to the cylindrical inner and outer side surfaces of the lower race element;
   (e) catcher grooves disposed on the inside and outside side wall surfaces of the lower race element;
   (f) inside and outside extending sleeve elements secured to the upper race element and extending parallel to each other and into a sealing, contacting and sliding relationship with the inside and outside bearing-liner material, respectively, on the side wall of the lower race element; and
   (g) a washer element composed of a soft metal bonded to the lower surface of the lower race element.

11. A hanger-liner assembly for suspending a lower pipe and an upper pipe in a well bore, which hanger-liner assembly comprises a plurality and spaced-apart, individual hanger units having an improved bearing assembly of claim 10 connected to the upper well pipe, to permit rotation of the lower well pipe relative to the upper well pipe.

* * * * *